US009666043B2

(12) United States Patent
Carrender et al.

(10) Patent No.: US 9,666,043 B2
(45) Date of Patent: May 30, 2017

(54) DETECTION SYSTEM AND DEVICE (71) Applicants: Eastern Aero Marine, Inc., Miami, FL (US); Thinkify, LLC, Morgan Hill, CA (US)

(72) Inventors: Curtis L. Carrender, Morgan Hill, CA (US); Peter R. Soule, Los Gatos, CA (US)

(73) Assignees: Eastern Aero Marine, Inc., Miami, FL (US); Thinkify, LLC, Morgan Hill, CA (US)

( * ) Notice: Subject to any disclaimer, the term of this patent is extended or adjusted under 35 U.S.C. 154(b) by 0 days.

(21) Appl. No.: 14/376,813

(22) PCT Filed: Feb. 6, 2013

(86) PCT No.: PCT/US2013/024994
§ 371 (c)(1),
(2) Date: Nov. 5, 2015

(87) PCT Pub. No.: WO2013/119713
PCT Pub. Date: Aug. 15, 2013

(65) Prior Publication Data
US 2016/0180664 A1     Jun. 23, 2016

Related U.S. Application Data

(60) Provisional application No. 61/595,555, filed on Feb. 6, 2012.

(51) Int. Cl.
*G08B 13/14*     (2006.01)
*G08B 13/06*     (2006.01)
(Continued)

(52) U.S. Cl.
CPC ....... *G08B 13/06* (2013.01); *G06K 19/07381* (2013.01); *G06K 19/07749* (2013.01);
(Continued)

(58) Field of Classification Search
CPC .......... G06K 19/0723; G06K 19/0772; G06K 19/07749; G06K 19/07758;
(Continued)

(56) References Cited

U.S. PATENT DOCUMENTS 5,347,262 A * 9/1994 Thurmond ......... G08B 13/2448
340/572.9
5,898,370 A * 4/1999 Reymond ............ G06K 19/073
340/572.1
(Continued)

FOREIGN PATENT DOCUMENTS

JP     2000-067332 A     3/2000

*Primary Examiner* — Thomas Mullen
(74) *Attorney, Agent, or Firm* — Seed IP Law Group LLP (57) ABSTRACT

A detection system for use with an article, the system including a frangible fastener having a shaft structured to be attached to the article; and a radio frequency communication circuit formed on or in the fastener, the radio frequency communication circuit including an antenna formed on or in the article; and a resonator component formed on or in the fastener shaft and structured to be coupled to the antenna through inductance when the fastener is attached to the article and the antenna is energized, the resonator element further structured to fail to function when the fastener shaft is broken.

9 Claims, 4 Drawing Sheets

US 9,666,043 B2

Page 2

(51) Int. Cl.
*G06K 19/073* (2006.01)
*G06K 19/077* (2006.01)
*G08B 13/12* (2006.01)

(52) U.S. Cl.
CPC . *G06K 19/07758* (2013.01); *G06K 19/07794* (2013.01); *G06K 19/07798* (2013.01); *G08B 13/12* (2013.01)

(58) Field of Classification Search
CPC ....... G06K 19/07798; G06K 19/07381; G06K 19/07794; G08B 13/2402; G08B 13/2405; G08B 13/2414; G08B 13/2417; G08B 13/2434; G08B 13/2448; G08B 13/06; G08B 13/12; A61J 2205/60; B65D 2101/00; B65D 2203/10
USPC .................................. 340/572.1, 572.7–572.9
See application file for complete search history.

(56) References Cited

U.S. PATENT DOCUMENTS

| | | | |
|---|---|---|---|
| 7,412,898 B1* | 8/2008 | Smith | G01L 5/24 73/761 |
| 2004/0041709 A1 | 3/2004 | Forster | |
| 2004/0227632 A1 | 11/2004 | Grijalva et al. | |
| 2006/0118435 A1 | 6/2006 | Cronin et al. | |
| 2007/0205902 A1 | 9/2007 | Cote et al. | |
| 2011/0006895 A1* | 1/2011 | Nelson | G08B 13/1409 340/541 |
| 2012/0235815 A1* | 9/2012 | Coveley | G06K 19/07749 340/572.1 |

* cited by examiner

DETECTION SYSTEM AND DEVICE

BACKGROUND

Technical Field

The present disclosure is directed to security systems that determine the status of an article and, more particularly, to a detection system and device that provides for remote scanning of one or more containers to determine a condition of each container, such as whether a container has been tampered with, moved, or opened.

Description of the Related Art

Numerous devices and systems have been developed to monitor the condition of containers in order to protect them from tampering, unwanted movement, and theft. Many monitoring systems are passive in nature in that they only provide surveillance capability. Active systems can include a notification feature, such as an alarm, that will activate when the container or its contents are disturbed. The first approach is continuous in that it is always activated, thus requiring a source of constant energy and in some cases constant observation by a user. The second approach may also require constant consumption of energy as well as one or more responders who will be available to respond to the alarm condition.

In certain applications, however, it is only necessary to periodically check a container or its contents to determine its condition. One example is under-seat life vest containers for commercial aircraft. Typically these containers only need to be inspected on a periodic basis to verify their presence and condition, i.e., has the container been relocated or repositioned, has it been tampered with or opened, and has the life vest been tampered with or taken out of the container.

Surprisingly, life vests are often stolen for personal use or resale. For example, in some territories of the world, aviation life vests are used as toys for children at the beach. This is a serious problem for the airlines because they are responsible for insuring that each seat has a flotation device. Another issue is one of security. The concern is that the container can be opened and a handgun, bomb, or drugs could be placed inside for use at a later time. While the bathroom and other locations on commercial aircraft are currently checked for security prior to most flights, the status of every under-seat container cannot be quickly or easily verified although such may be required in certain countries or by airline rules. Hence, there is a need for a system that enables rapid and accurate determination of the condition of under-seat containers on commercial aircraft as well as on other modes of transportation, such as ships and ferries.

BRIEF SUMMARY

In one embodiment of the present disclosure, a device for use with an article is provided. The device is operationally coupled to an antenna on the article and includes a fastener having a frangible shaft. The device further includes a radio frequency communication circuit mounted on or in the fastener with the circuit having a resonator component formed on or in the fastener shaft and configured to be coupled to the antenna through inductance and further configured to fail to function in response to fracturing of the fastener shaft.

In accordance with another embodiment of the present disclosure, a detection system for use with an article is provided, the system having a fastener with a breakable shaft structured to be attached to the article. The system further includes a radio frequency communication circuit formed on or in the fastener, the radio frequency communication circuit having an antenna formed on or in the article and a resonator component is formed on or in the fastener shaft and configured to be coupled to the antenna through inductance when the fastener is attached to the article and the antenna is energized. The resonator element is structured to fail to function in response to breaking of the fastener shaft, rendering the radio frequency communication circuit non-responsive.

In accordance with a further aspect of the present disclosure, a containment system is provided, the containment system including a container having an interior defined by a housing and at least one cover that is openable to provide access to the housing of the container, and a fastener securing the at least one cover to the housing and having a frangible shaft extending through the housing and the cover and configured to break in response to manual opening of the cover. A radio frequency communication circuit is formed on or in the fastener, the radio frequency communication circuit including an antenna formed on or in the article and a resonator component formed on or in the fastener shaft and structured to be coupled to the antenna through inductance in response to attachment of the fastener to the article and energizing of the antenna. The resonator element is further configured to fail to function when the fastener shaft is broken. The system also includes an interrogator configured to communicate with the radio frequency communication circuit to determine the status of the resonator element, e.g., is it functioning, which could indicate the container has been opened or tampered with or moved out of range of the interrogator.

As will be readily appreciated from the foregoing, the present disclosure provides a way to quickly check the status of any container, such as whether it had been opened or not. With this system, no residue is left behind, such as from an adhesively secured fastener. In addition, the solution provides for a tamper-proof detection device that also has the dual function of securing the container in a closed condition. When formed as a button-type fastener, it is easily deployed and replaced when broken. The use of radio frequency identification technology allows the condition of the RFID-enabled fastener to be read at 1 meter or more. With this system, an individual with a handheld interrogator could "inventory" the status of all life vest containers on a large passenger aircraft in a manner of minutes.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with different types of radio frequency communication circuits and containers, methods of construction, and material selection have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, such as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
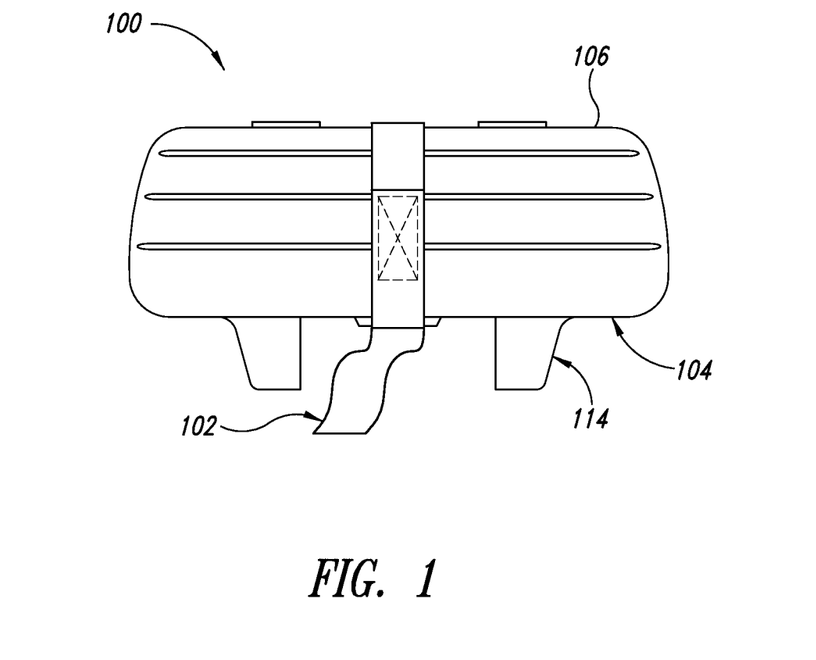
FIG. 1 is an isometric view of a conventional life vest container for use on commercial aircraft.

Referring initially to FIG. 1, shown therein is an existing commercial aircraft life vest container 100. A pull strap 102 is shown on the front of the container 100, which is used to retrieve the container 100 from under an aircraft seat and to open the container 100. Because these containers come in many configurations and are readily commercially available, they will not be described in detail herein. Briefly, the container 100 has a housing 104 to which is mounted a cover 106, preferably with a hinge. The housing 104 is sized and shaped to hold a life vest or life jacket, typically sealed inside a pouch (not shown). In this particular design, two brackets 114 extend from the bottom of the container housing 104 to facilitate under-seat mounting.

Figure 2:
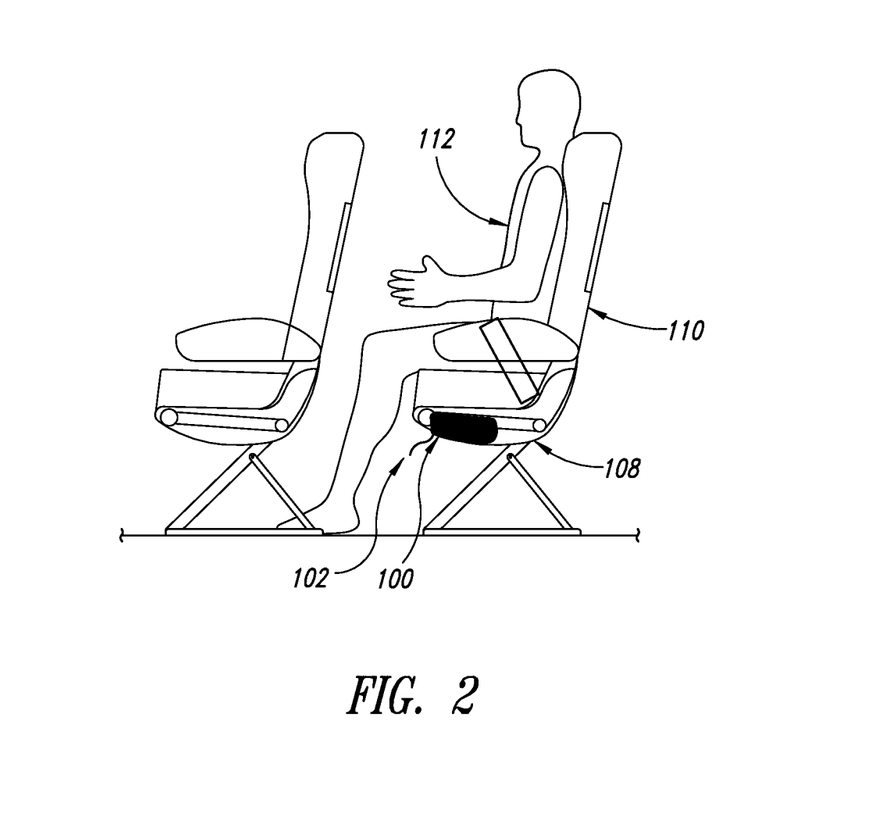
FIG. 2 is a side view of the container of FIG. 1 stored in an under-seat storage area below an aircraft passenger seat.

FIG. 2 illustrates the mounting position of the container 100 under the seat portion 108 of a typical passenger seat 110 used in commercial aircraft. As can be seen in this side view, the pull strap 102 in this configuration hangs down below the container 100 to be available for the passenger 112 to reach down and grasp for removal. In some designs, the pull strap 102 is used to open the container, which provides access to the life vest pouch. As will be appreciated from this view, visual inspection of the container within the tight confines of airline seating configurations is difficult at best.

In accordance with the present disclosure, a system and device are provided to facilitate rapid determination of the state of a life vest container while installed under the passenger seat in commercial aircraft. It is to be understood that while representative embodiments are illustrated and described in the context of airline life vest containers, the disclosed system and device will have application, with possible modifications, in determining the status of many types of containers in a variety of deployments as described in more detail below. Hence the following detailed description is directed to a preferred embodiment for use in assessing the condition of aircraft life vest containers.

Figure 3:
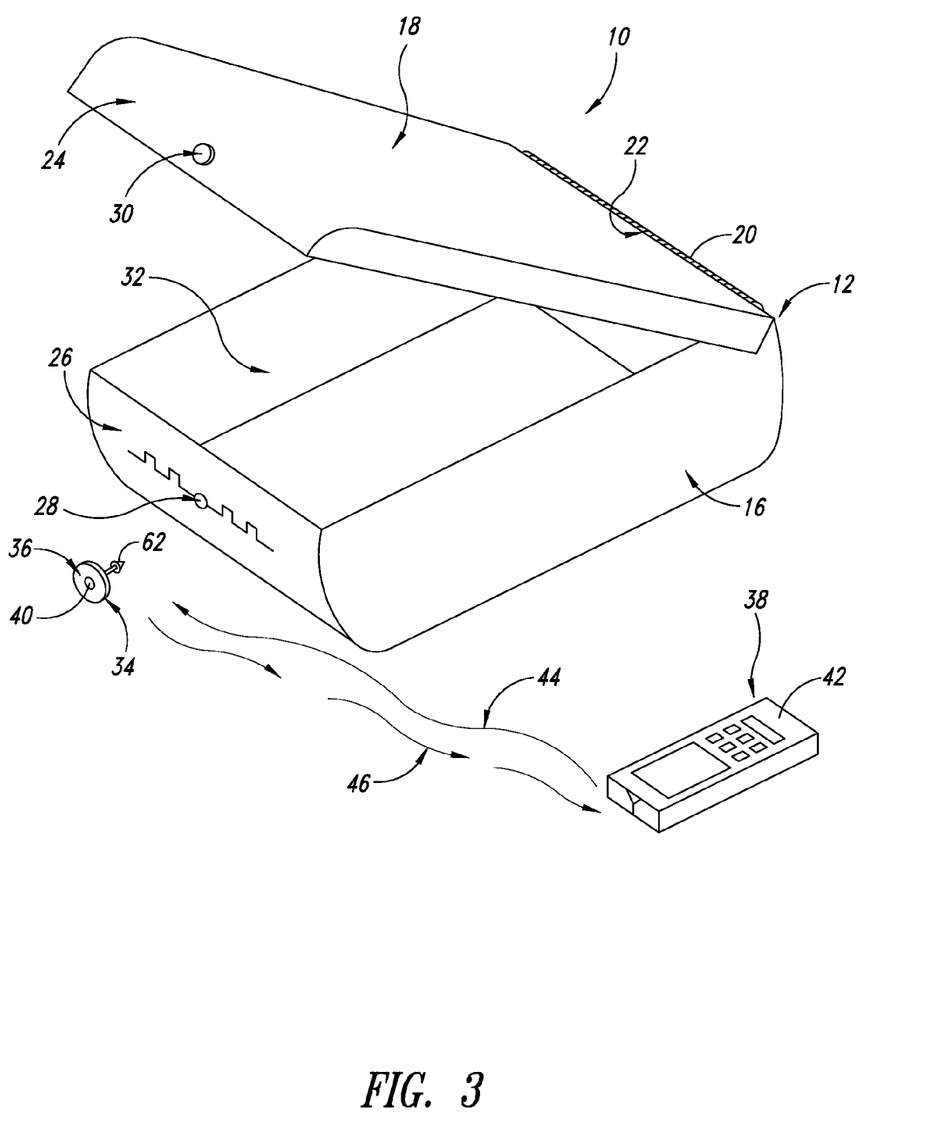
FIG. 3 is an isometric view of a system for monitoring the condition of a container.

Shown in FIG. 3 is a representative embodiment of a containment security system 10 for use with a container 12 configured to store a life vest (not shown). The container 12 includes a housing 16 with an interior 32 and an attached lid or cover 18 that is structured to pivot about a hinged connection 20, which is formed along an aft or rear edge 22 of the cover 18 and the housing 16. More particularly, the cover 18 moves between an opened configuration, which provides access to the interior 32, and a closed configuration, which completely encloses the interior 32. As illustrated in FIG. 3, the container 12 is in the opened configuration in which the cover 18 does not overlay the housing 16.

The forward wall 26 of the housing 16 and the forward edge 24 of the cover 18 each contain a respective opening 28, 30 that overlap when the container 12 is in the closed configuration (shown in FIG. 5) so as to create a single passageway from the outside of the container 12 to the interior 32. Generally these life vest containers are formed of lightweight plastic in order to conserve weight on the aircraft. In commercial passenger aircraft, these containers generally are not waterproof or airtight. As such, a fastener secured through the opening 28 in the forward wall 26 of the container housing 16 and the opening 30 in the forward edge 24 of the cover 18 does not need to make an airtight fitting or demonstrate an ability to withstand water or other liquids. However, in applications where these conditions need to be considered, the fastener can be modified in its construction to provide an airtight or watertight fitting.

Also shown in FIG. 3 is a fastener 34 sized and shaped to fit partially through the openings 28, 30 in accordance with one aspect of the present disclosure. In particular, the fastener 34 is sized and shaped to be inserted into the passageway created by the overlapping openings 28, 30 in the container 12 and as such hold the lid or cover 18 in the closed configuration.

A communication device 36 is formed on or in the fastener 34 that provides for radio frequency communication with a corresponding remote transceiver device 38. In this embodiment of the disclosure, the communication device 36 and the transceiver device 38 utilize radio frequency communications, preferably in the Ultra-High Frequency (UHF) range. Preferably, the radio communication device 36 on the fastener 34 is configured as a transponder 40 and the transceiver device 38 is configured as an interrogator 42 or reader that sends interrogation signals 44 to the transponder 40. Upon receipt of the interrogation signals 44, the transponder 40 is configured to send a return signal 46 to the interrogator 42. This form of radio frequency communication is employed in radio-frequency identification (RFID) systems that are well known in the industry and will not be described in detail herein.

Generally, an RFID system utilizes an interrogator or reader that transmits an interrogation signal at a frequency that activates or energizes an antenna on a transponder or "tag." Passive transponders extract energy from the interrogation signal to power the internal circuits and to "reflect" a signal back to the interrogator or to other nearby tags, interrogators, and receivers. The reflected signal is modulated to incorporate data stored on the tag. In some cases, the interrogation signal is used to program the tag with data, or the tag includes sensors that provide data to the tag's memory. More sophisticated tags have an onboard or nearby source of power that allows for enhanced functionality of the tag.

Figure 4:
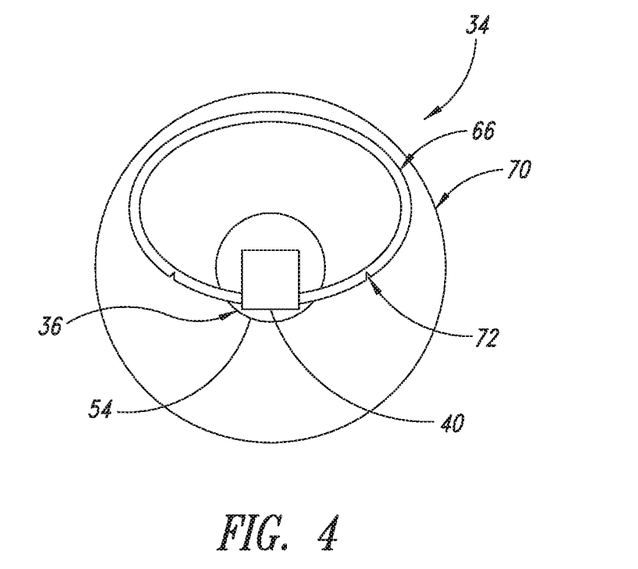
FIG. 4 is a front view of a fastener and spacer formed in accordance with the present disclosure.
Figure 5:
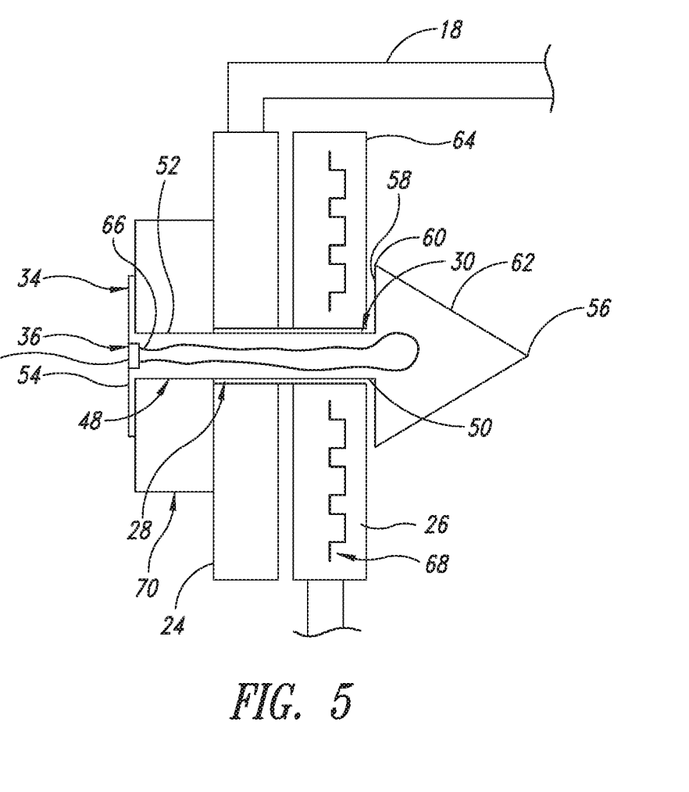
FIG. 5 is an enlarged cross-sectional view of the fastener of FIG. 2.

Referring next to FIGS. 4 and 5, the fastener 34 includes a frangible shaft 48 having a distal end 50 and a proximal end 52. Formed on the proximal end 52 is a head 54 and at the distal end 50 is a terminal point 56. Frangibility as used here means the shaft will break or fracture into pieces instead of deform plastically and retain its integrity. Alternatively the shaft would be torn or ripped sufficiently to lose its electrical functionality.

Ideally the shaft 48 has a circular cross-sectional configuration, although it may take other geometric shapes, including without limitation triangular, square, rectangular, pentagonal, trapezoidal, and the like. Preferably a circular cross-sectional shape is used to conserve materials, avoid sharp edges, and maximize strength relative to the amount of material. In addition, while the shaft 48 shown in FIG. 1 has a solid construction, it is to be understood that the shaft 48 could have one or more longitudinal openings so that the shaft is split longitudinally from the terminal point 42 to somewhere along the shaft 48. This permits the resulting halves (or two or more elongate sections) to be urged together to reduce the effective diameter of the shaft 48 and facilitate insertion of the terminal point 42 through the openings 28, 30 in the container 12.

As shown in FIG. 5, the shaft 48 has a shoulder 58 extending laterally outward from around the circumference of the shaft 48 at a distal end 50, preferably at a 90 degree angle to a sidewall 46 of the shaft 48. The shoulder 58 formed on the distal end 50 extends radially outward from the shaft 48 to a point 60 that intersects with a cone-shaped face 62 that converges towards a terminal point 56. The shoulder 58 extends a sufficient distance radially outward from the shaft 48 to enable it to act as a retainer to prevent the fastener 34 from being pulled outward through the openings 28, 30 (to the left as shown in FIG. 5). In other words, the shoulder 58 is flexible enough to bend, deform or fold and be forced through the openings 28, 30 in a first direction (to the right as shown in FIG. 5) and then, once through the opening, to return to its original shape and size to extend beyond the diameter of the openings 28, 30 and bear against or be able to bear against an inside surface 64 of the forward wall 26 of the housing 16, thus securing the fastener 34 in place.

The fastener 34 as previously described includes the transponder 40 formed on or in the head portion 54 or on or in the proximal end 52 of the shaft 48. Electrically coupled to the transponder 40 is a resonator component 66 that is formed on or in the fastener 34, ideally on or in the shaft 48 thereof. The resonator component 66 can also extend into the enlarged distal end 50 of the shaft 48 as shown in FIG. 5. The resonator component 66 is an electrical conductor that cooperates with the transponder 40 to enable radio frequency communication. An antenna for the transponder 40 may be formed on or in one of either the cover 18 or forward wall 26 of the container 16. As shown in FIG. 5, an antenna 68 is configured as a dipole antenna that is formed in the forward wall 26 of the container 12. Coupling of the antenna 68 with the transponder 40 is done inductively with the resonator component 66 in response to attachment of the fastener 34 and energizing of the antenna 68. In other words, after the fastener 34 is inserted through the openings 28, 30, the resonator component 66 is in close proximity to the antenna 68. When the antenna 68 is energized by the interrogation signal 44, it is inductively coupled to the resonator component 66 and electric current is thus induced in the resonator component 66 and sent to the transponder 40. The antenna 68, resonator component 66, and transponder 40 together form a radio frequency communication circuit. In this case, because the transponder 40 is a passive device, it receives its operational power from the antenna 68 when the antenna 68 is energized.

A spacer 70 is shown positioned between the head 54 of the fastener 34 and the forward edge 24 of the cover or lid 18. The spacer 70 enhances the holding power of the fastener 34, which is in one embodiment formed completely of frangible material as discussed above. More particularly, the material used for the fastener 34 will be configured to allow the fastener to fracture or break into pieces sufficiently to destroy the resonator functionality. Alternatively, the tag would tear, rupture, or be torn to the point it would lose functionality.

The communication device 36 in the form of the transponder 40 is preferably a passive device, thus requiring no outside source of power other than the interrogation signal from the interrogator 42. It is sized and shaped to be easily inserted into the passageway formed by the openings 28, 30 in the container 12 and to be securely retained in place by the enlarged distal end 50 and shoulder 58 formed thereon.

Ideally the shaft 48, and preferably the entire fastener 34, is formed of frangible material that will sever when subjected to the shear force of the cover 18 being opened with respect to the container 16. However, only the shaft portion 48 needs to be made of frangible material of sufficient strength to hold the container 12 closed and to fracture and sever when a user manually opens the container 12. In other words, when a user opens the container 16, the forward edge 24 of the cover 18 will be forced to slide upward relative to the forward wall 26 of the housing 16, creating a shear force that acts on the frangible shaft 48 to sever it.

When the shaft 48 is severed, it also breaks the resonator member 66 or the connection of the resonator member 66 with the communication circuit 36 or transponder 40. For example, the resonator member 66 will break sufficiently to impair the flow of current therethrough, rendering it non-functional. When the interrogation signal 44 is transmitted from the interrogator 42, the transponder 40 will fail to respond, alerting an operator of the interrogator 42 to the fact that the fastener 34 has been broken. This is an indication that the container 12 has been tampered with, opened, or otherwise damaged and needs to be further inspected to determine its condition.

In order to facilitate severing or breakage of the resonant member 66, a prestressed failure point 72 can be formed on the resonator member 66 as shown in FIG. 4. The selection of materials for the resonator member 66 and the fastener 34 will depend on the particular deployment of the fastener 34. In the context of a life vest container, the material and dimensions of the fastener 34 should be selected to permit manual opening of the container by passengers on an aircraft. In some jurisdictions, this will be determined by the statutes or regulations of the governing bodies. In others, it will be determined by the amount of force expected to be exerted by the weakest of passengers who would be attempting to open the container 12.

In accordance with another aspect of the present disclosure, the inductive coupling between the resonator member 66 and the antenna 68 would be broken if the fastener 34 were somehow removed from the container 16 without fracturing. During interrogation, the fastener would fail to respond, even if it were nearby, because the inductive coupling via the close association of the resonator with the antenna would be broken.

In accordance with another embodiment of the present disclosure, the resonator member can be employed within the container strap or a tether or other flexible filament that is attached to a container or other object to be monitored by a fastener containing the integrated circuit on which the transponder circuitry is formed. The strap could include an antenna element along with the resonator member, or the resonator member could inductively communicate with an antenna element formed on the container or object to be monitored or on a structural member to which the strap is attached. Having the strap in close proximity to the antenna would result in inductive coupling with the resonator member as described above when the antenna is energized. Alternatively, an active circuit can be used that is coupled to the resonator member to enhance sensitivity of the resonator member and facilitate inductive coupling with the antenna.

The flexible filament or tether would be formed of material that could easily be fractured or torn apart such that the resonator member would be disconnected from the antenna and the integrated circuitry on which the transponder is formed, resulting in loss of function of the communication circuit. When interrogated by the interrogator, there would be no response, alerting a user that the object has been moved from its intended location.

In an alternative embodiment, passive radio frequency communication circuits, embodied as Application Specific Integrated Circuits (ASICS), can be used to implement the present disclosure. In addition, there are available RFID chips that incorporate input-output capabilities in which sensors can be used to detect the condition of an object and to send a detection signal to the RFID chip. For example an I/O port could be utilized in connection with the frangible shaft to test the status of the frangible shaft and provide a response signal to an interrogator indicative of the shaft condition. In such an implementation, the "resonant portion" would stay undisturbed and functional, allowing the RFID circuit to communicate with an interrogator, and a sensor associated with the frangible fastener or the frangible shaft would sense and report when the shaft is destroyed. One method of sensing the shaft condition is to sense an open circuit condition in the shaft when the shaft is broken.

Thus a device for use with an article having an antenna is also provided herein. The device includes a fastener; and a radio frequency communication circuit electrically coupled to the fastener. The circuit includes an antenna, a communication circuit coupled to the antenna, and a control loop formed on or in the fastener and configured to electrically communicate with the communication circuit, the control loop configured to cease to conduct electricity when the fastener is manipulated and thereby change the operation characteristics of the communication circuit.

Figure 6A:
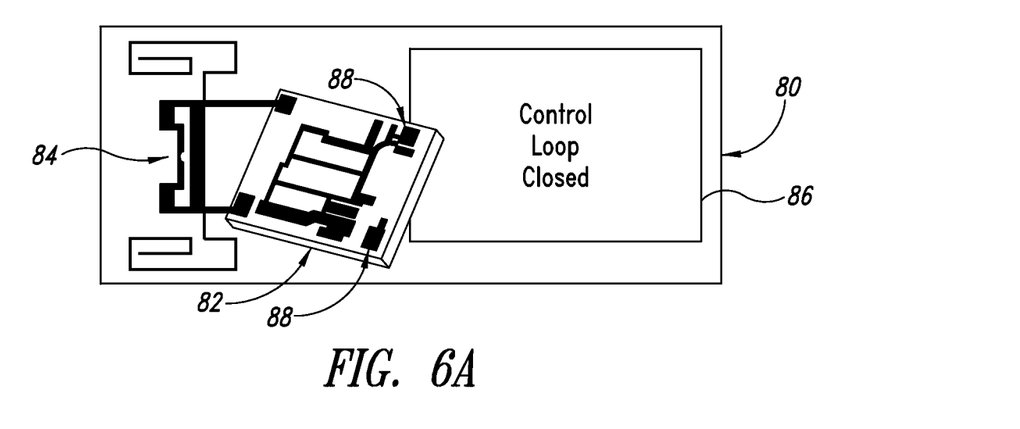
FIGS. 6A and 6B are illustrations of a frangible tag in both a closed loop and open loop configuration.
Figure 6B:
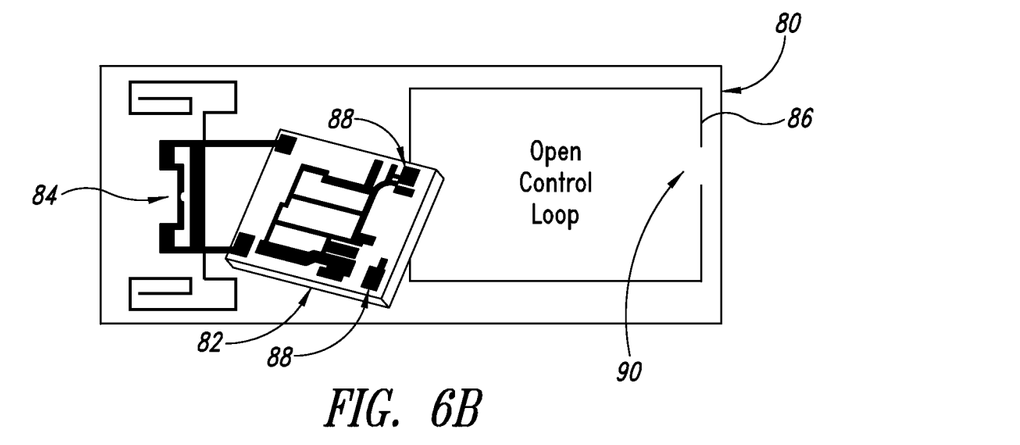

FIGS. 6A and 6B illustrate an alternative aspect of the present disclosure in which a frangible tag 80 is illustrated. As shown, a circuit portion 82 is coupled to an antenna or resonator portion 84. A conductive control loop 86 is coupled to I/O ports 88 on the circuit portion 82. When the control loop 86 is intact as shown in FIG. 6A, it is able to conduct electricity between the I/O ports 88. However, if the tag 80 is manipulated to the point that it breaks or tears across the open loop 86, as shown at 90 in FIG. 6B, the control loop 86 will stop conducting. The tag 80 will still be able to communicate, however, because the remainder of the circuit portion 82 and antenna or resonator 84 remain functional and able to communicate with an interrogator. When the control loop 86 stops conducting, it will cause a change in the operational characteristics of the tag such that the change in operational characteristics are detected by an external interrogator or remote reader (not shown). This could include a change in the characteristics of the return signal from the tag 80 to the reader.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for use with an article having an antenna, the device comprising:
   a frangible fastener having a shaft; and
   a radio frequency communication circuit mounted on or in the fastener, the circuit having a resonator component formed on or in the fastener shaft and configured to be coupled to the antenna through inductance and further structured to fail to function in response to fracturing of the fastener shaft.

2. The device of claim 1 wherein the fastener shaft has a proximal end and a distal end and the fastener includes a head at the proximal end of the shaft, and wherein the radio frequency communication circuit is formed on or in the head of the fastener with the resonator element extending on or in the shaft.

3. A detection system for use with an article, the system comprising:
   a frangible fastener having a shaft structurally configured to be attached to the article; and
   a radio frequency communication circuit formed on or in the fastener, the radio frequency communication circuit including:
      an antenna formed on or in the article; and
      a resonator component formed on or in the fastener shaft and configured to be coupled to the antenna through inductance in response to attachment of the fastener to the article and energizing of the antenna, the resonator element further configured to fail to function in response to breaking of the fastener shaft.

4. The detection system of claim 3 wherein the fastener shaft has a proximal end and a distal end and the fastener includes a head at the proximal end of the shaft, and wherein the radio frequency communication circuit is formed on or in the head of the fastener with the resonator element extending on or in the shaft.

5. The system of claim 3, comprising an interrogator configured to communicate with the radio frequency communication circuit.

6. A containment system, comprising:
   a container having a housing and at least one cover that define an interior, wherein the at least one cover is openable to provide access to the interior of the container;
   a frangible fastener securing the at least one cover to the housing and having a shaft extending through the housing and the cover and configured to break in response to manual opening of the cover;
a radio frequency communication circuit formed on or in the fastener, the radio frequency communication circuit including:
an antenna formed on or in an article; and
a resonator component formed on or in the fastener shaft and configured to be coupled to the antenna through inductance in response to attachment of the fastener to the article and energizing of the antenna, the resonator component further configured to fail to function in response to breaking of the fastener shaft; and
an interrogator configured to communicate with the radio frequency communication circuit to determine if the resonator component is functioning.

7. The containment system of claim 6 wherein the fastener shaft has a proximal end and a distal end, and the fastener includes a head at the proximal end of the shaft, and wherein the radio frequency communication circuit is formed on or in the head of the fastener with the resonator component extending on or in the shaft.

8. A device for use with an article having an antenna, the device comprising:
a fastener; and
a radio frequency communication circuit structurally coupled to the fastener, the radio frequency communication circuit including:
an antenna;
a resonator component coupled to the antenna; and
a control loop formed on or in the fastener and configured to electrically communicate with the resonator component, the control loop configured to cease to conduct electricity when the fastener is manipulated and thereby change the operational characteristics of the radio frequency communication circuit.

9. The device of claim 8 wherein the radio frequency communication circuit is configured to respond to an interrogation signal with a first response signal when the control loop is electrically conductive and to respond to an interrogation signal with a second signal when the control loop is not electrically conductive.

* * * * *